May 14, 1957 H. V. FLAGG 2,792,180
TEMPERATURE CONTROL VALVE
Filed Nov. 1, 1952
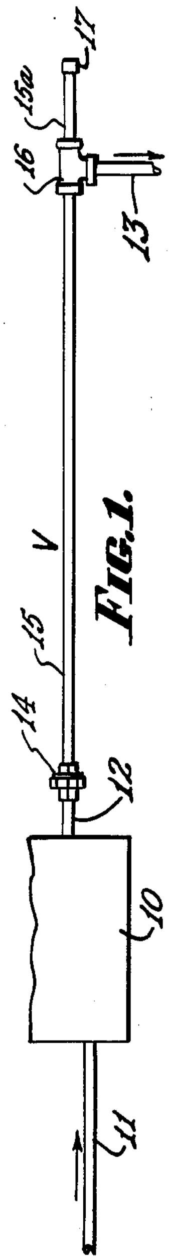
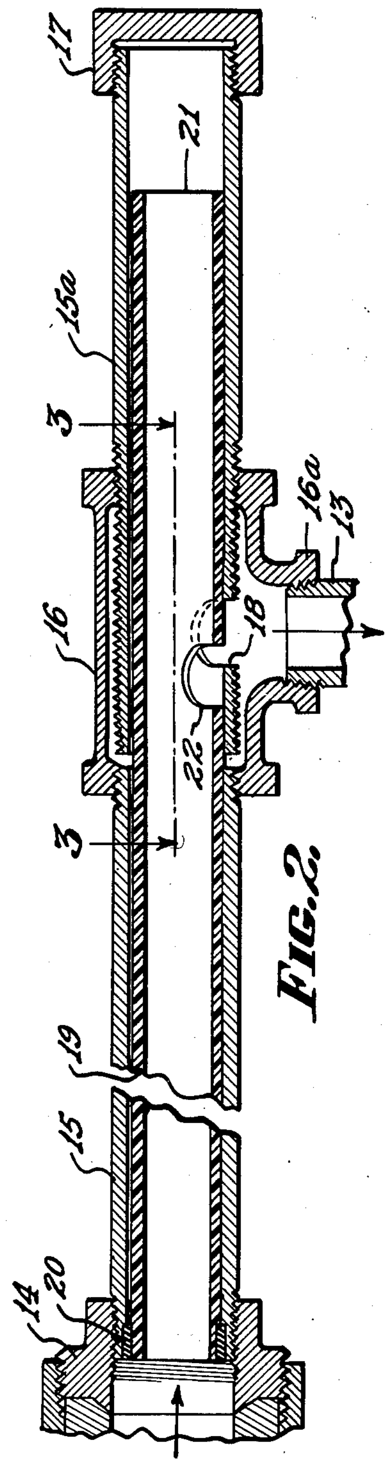
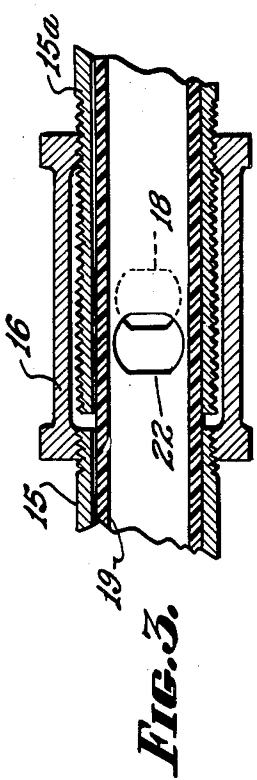
INVENTOR.
HAROLD V. FLAGG,
BY
Allen & Allen
ATTORNEYS.

2,792,180
Patented May 14, 1957

2,792,180

TEMPERATURE CONTROL VALVE

Harold V. Flagg, Middletown, Ohio, assignor to Armco Steel Corporation, Middletown, Ohio, a corporation of Ohio Application November 1, 1952, Serial No. 318,290

8 Claims. (Cl. 236—93)

This invention relates to a temperature control valve and more particularly to a valve suitable for the control of the flow of water in cooling systems for high temperature melting and heating furnaces and the like.

The usual procedure in water cooling systems for such high temperature melting and heating furnaces is to pump water through the cooling pipes in a recirculating system at a constant heat. The effect of this is that the same quantity of water is pumped through each individual cooler all of the time entirely without regard to the need of each individual cooler. At many points in such cooling systems temperatures are encountered which are sufficiently high to be destructive to refractories, and therefore, there is obviously a greater need for cooling at some points than there is at others. With conventional systems as outlines above the result is that unimportant coolers may be furnished three or four times as much water as they need, while indispensable coolers may fail because they are not provided with sufficient water.

With the foregoing considerations in mind it is an object of the invention to provide a temperature control valve which will be so inexpensive that it can be installed on each cooler discharge line where it will regulate automatically the amount of water so that the particular cooler will receive just that amount of water which is required to remove the heat to which it is subjected.

It is another object of the invention to provide a valve which is simple in construction and is so designed that it will not fail because stoppage is impossible.

It is a further object of the invention to provide a valve which will substantially decrease maintenance expense on coolers, and which is so simple to install that there is a substantial decrease in the labor required to replace failed coolers.

These and other objects of the invention which will be pointed out in greater detail hereinafter, or which will be apparent to one skilled in the art upon reading these specifications, are accomplished by that certain construction and arrangement of parts, of which I shall now described an exemplary embodiment. Reference is made to the drawings forming a part hereof, and in which:

Figure 1 is a diagram showing the location of my novel valve;

Figure 2 is a longitudinal cross sectional view through a valve according to the invention;

Figure 3 is a fragmentary cross sectional view taken on a line 3—3 of Figure 2.

Briefly, in the practice of the invention I provide a length of pipe closed at one end and having a lateral port opening near the closed end. Within this pipe I provide a second length of pipe secured to the first length at the end opposite the closed end, and also having a lateral port which is normally in partially overlapping relation with the port in the outside pipe. The material of the inside pipe has a coefficient of expansion greatly different from that of the outside section of pipe so that as the temperature of water flowing through the pipe increases the inner pipe is caused to elongate and move into better registry with the lateral port in the outer pipe. The outer pipe is embraced by a T fitting, the central branch of which is disposed opposite the lateral port.

Referring now in more detail to the drawing, I have shown in Figure 1 a cooler generally at 10 with the inlet line 11 and the outlet line 12. The valve proper is indicated at V, and the outlet line from the valve is indicated at 13.

In Figure 2, I have shown a longitudinal cross section through the valve V and the associated T fitting. The valve is secured to the outlet line 12 by means of a coupling 14, as is well known in the art.

A section of pipe, which is preferably steel pipe, is indicated at 15 and is screwed into the coupling 14. At its other end the pipe 15 is screwed into one branch of the T fitting 16. A shorter length of steel pipe **15*a* is threaded into the other end of the T fitting 16 so that its end is close to the end of the length 15. The outer end of the pipe 15*a* is closed by a cap 17. The pipe 15*a* is provided with a lateral port 18. It will be observed that the pipe 15** is shown as broken, and it will be clear from a consideration of Figure 1 that it is of substantial length.

Within the pipes 15 and **15*a* there is provided a pipe 19 which is secured to the pipe 15 by any suitable means, as at 20. It may be secured by screws, rivets, or adhesively. The pipe 19 fits snugly within the pipes 15 and 15*a* and terminates at 21 short of the end of the pipe 15*a*. The pipe 19 is provided with a port 22 which under normal conditions partially overlaps the port 18**.

It will be observed that the T fitting 16 is so disposed with respect to the pipe section **15*a* that the branch fitting 16*a* is disposed in the region of the port 18. In this way then the pipe 13** may be attached as shown.

The outer pipe is made in two sections 15 and **15*a* principally to facilitate assembly. The construction shown also, to some extent, minimizes the movement of the port 18 under the influence of heat. It will be clear that as the water flowing through the valve increases in temperature, the pipe 19 expands linearly causing the port 22 to move toward the right. Ast the port 22 moves toward the right it comes more and more into registry with the port 18 so that the effective area of the port is increased. As the temperature of the water flowing through the valve drops, the pipe 19 shrinks and the port 22** moves toward the left in Figure 2, thus effectively closing or reducing the area of the port.

It will be clear that any two materials having different coefficients of expansion can be used for the pipes 15, **15*a* on the one hand and 19 on the other hand, and that the closer the coefficients of expansion are the longer the valve V will have to be. I have found that the necessary length of the valve can be greatly reduced if the inner tube 19** is made from a non-metallic material. Preferably, I use a hard polymerized organic material which is inert to water at temperatures up to the boiling point of water and which have a high coefficient of expansion. As a preferred example, I use acetobutyrate, but it will be understood that any of the butyrates functions as the equivalent of acetobutyrate. The same is true of other plastic materials such as hard rubber, ethyl cellulose, polyvinyl chloride, silicone rubber and similar materials. All of these materials and others of like nature are equivalents of acetobutyrate as far as the purpose of this invention are concerned. It is only necessary that the material have a high coefficient of expansion that it must be stable under water and inert under water up to temperatures at the boiling point.

As an example, with acetobutyrate I find that if the distance from the left hand end of the tube 19 to the port 22 is approximately 5′, I obtain an increase in length of approximately ¼″ for a 50° F. rise in temperature.

As is clear from the drawings I prefer that the ports 18 and 22 be elliptical in shape, and that in the normal condition, that is at room temperature, the ports overlap by about ⅓, and that at temperatures of about 170° F. they overlap about ⅔. In other words, the port 18 is never fully closed nor fully open. Water will at all times flow through the port, but the amount flowing will be determined by its temperature. The hotter the water the greater the effective area of the port, and therefore, the greater flow.

It will be clear that numerous modifications may be made without departing from the spirit of the invention, and I therefore wish it to be understood that I do not intend to limit myself in any way other than as set forth in the claims which follow.

Having now fully described my invention what I claim as new and desire to secure by Letters Patent, is:

1. A temperature control valve for water cooling lines comprising a conduit through which coolant water flows, said conduit comprising a relatively long first length of pipe and a relatively short second length of pipe, said second length of pipe having a lateral port near one end and closed at the other end, and a T fitting, said lengths of pipe being threadably engaged in the aligned openings of said T fitting with said lateral port in the region of the center branch of said T fitting, and a third length of pipe shorter than the length of the combined first and second lengths, secured to said first length at the end opposite said T fitting, telescopingly disposed within said first and second lengths, and having a lateral port normally partially overlapping the port in said second length, said third length of pipe having a different coefficient of expansion from the first and second lengths of pipe, whereby as the temperature of the coolant water flowing through said conduit rises, the effective area of said overlapping ports increases.

2. A temperature control valve for water cooling lines comprising a conduit through which coolant water flows, said conduit comprising a relatively long first length of pipe and a relatively short second length of pipe, said second length of pipe having a lateral port near one end and closed at the other end, and a T fitting, said lengths of pipe being threadably engaged in the aligned openings of said T fitting with said lateral port in the region of the center branch of said T fitting, and a third length of pipe shorter than the length of the combined first and second lengths, secured to said first length at the end opposite said T fitting, telescopingly disposed within said first and second lengths, and having a lateral port normally partially overlapping the port in said second length, said third length of pipe having a coefficient of expansion which is greater than that of said first and second lengths of pipe, whereby as the temperature of the coolant water flowing through said conduit rises, said third length of pipe expands and its lateral port moves towards said closed end to increase the effective area of said overlapping ports.

3. A temperature control valve for water cooling lines according to claim 2, wherein said first and second lengths are of steel pipe, and said third length of pipe is of a non-metallic substance which is inert to water at temperatures up to the boiling point.

4. A temperature control valve for water cooling lines according to claim 2, wherein said first and second lengths are of steel pipe, and said third length of pipe is of a hard, polymerized, organic material which is inert to water at temperatures up to the boiling point.

5. A temperature control valve for water cooling lines according to claim 2, wherein said first and second lengths are of steel pipe and the distance between the end opposite said T fitting and said lateral port is approximately 5 feet and said third length of pipe is of a non-metallic substance which is inert to water at temperatures up to the boiling point, and which has a coefficient of expansion producing a linear movement of its lateral port on the order of ¼" for a 50° F. rise in temperature.

6. A temperature control valve for water cooling lines according to claim 2, wherein said first and second lengths are of steel pipe and the distance between the end opposite said T fitting and said lateral port is approximately 5 feet and said third length of pipe is of a hard, polymerized, organic material which is inert to water at temperatures up to the boiling point, and which has a coefficient of expansion producing a linear movement of its lateral port on the order of ¼" for a 50° F. rise in temperature.

7. A temperature control valve for water cooling lines according to claim 2, wherein said first and second lengths are of steel pipe and said third length of pipe is of acetobutyrate.

8. A temperature control valve for water cooling lines comprising a relatively long first length of pipe and a relatively short second length of pipe, a T fitting joining said two lengths of pipe in axial alignment, said short length of pipe being closed at its free end and one of said lengths of pipe having a lateral port therein positioned adjacent the center branch of said T fitting, and a third length of pipe telescopingly disposed within said first and second lengths of pipe and secured to said first length of pipe at the end thereof opposite said T fitting, said third length of pipe having a lateral port normally partially overlapping said first named port and a different coefficient of expansion from said first and second lengths of pipe, whereby as the temperature of the coolant water flowing through said pipes rises, the effective area of said overlapping ports increases.

References Cited in the file of this patent

UNITED STATES PATENTS

| | | |
|---|---|---|
| 522,158 | Edmonds | June 26, 1894 |
| 795,448 | McGonagle | July 25, 1905 |
| 963,007 | Mallory | June 28, 1910 |
| 994,481 | Sauer | June 6, 1911 |
| 1,050,225 | Nelson | Jan. 14, 1913 |
| 1,082,212 | Pollard | Dec. 23, 1913 |
| 1,752,116 | Smith | Mar. 25, 1930 |

FOREIGN PATENTS

| | | |
|---|---|---|
| 8,424 | Great Britain | Apr. 9, 1912 |